(12) United States Patent
Chen et al.

(10) Patent No.: US 10,113,046 B2
(45) Date of Patent: Oct. 30, 2018

(54) TETRAFLUOROBUTENE BLOWING AGENT COMPOSITIONS FOR POLYURETHANE FOAMS

(75) Inventors: Benjamin Bin Chen, Gilbertsville, PA (US); Joseph S. Costa, Gilbertsville, PA (US); Philippe Bonnet, Lyons (FR)

(73) Assignee: ARKEMA INC, King of Prussia, PA (US)

( * ) Notice: Subject to any disclaimer, the term of this patent is extended or adjusted under 35 U.S.C. 154(b) by 0 days.

(21) Appl. No.: 13/501,827

(22) PCT Filed: Oct. 20, 2010

(86) PCT No.: PCT/US2010/053296
§ 371 (c)(1),
(2), (4) Date: Apr. 13, 2012

(87) PCT Pub. No.: WO2011/050017
PCT Pub. Date: Apr. 28, 2011

(65) Prior Publication Data
US 2012/0202904 A1    Aug. 9, 2012

Related U.S. Application Data

(60) Provisional application No. 61/254,260, filed on Oct. 23, 2009.

(51) Int. Cl.
*C08J 9/14* (2006.01)
(52) U.S. Cl.
CPC .............. *C08J 9/146* (2013.01); *C08J 9/149* (2013.01); *C08J 2203/12* (2013.01); *C08J 2203/14* (2013.01); *C08J 2203/142* (2013.01); *C08J 2375/04* (2013.01)

(58) Field of Classification Search
CPC ................ C08J 2203/12; C08J 2203/14; C08J 2203/142; C08J 2375/04; C08J 9/146; C08J 9/149
USPC .................................................. 521/131, 170
See application file for complete search history.

(56) References Cited

U.S. PATENT DOCUMENTS

| | | |
|---|---|---|
| 5,756,869 A | 5/1998 | Yoshikawa |
| 8,198,340 B2 | 6/2012 | Vo et al. |
| 2005/0119512 A1 | 6/2005 | Du Boisson et al. |
| 2006/0142173 A1 | 6/2006 | Johnson et al. |
| 2009/0305876 A1 | 12/2009 | Singh et al. |
| 2010/0076100 A1 | 3/2010 | Chen |
| 2010/0087557 A1 | 4/2010 | Chen et al. |
| 2010/0105788 A1 | 4/2010 | Chen et al. |
| 2012/0085959 A1 | 4/2012 | Uenveren et al. |

FOREIGN PATENT DOCUMENTS

| | | | |
|---|---|---|---|
| WO | WO 2008/121783 | * | 10/2008 |
| WO | WO 2009/067720 A2 | | 5/2009 |

* cited by examiner

*Primary Examiner* — John M Cooney
(74) *Attorney, Agent, or Firm* — Steven D. Boyd

(57) ABSTRACT

A blowing agent for thermosetting foams is disclosed. The blowing agent is 2,4,4,4-tetrafluorobutene-1 alone or in combination with a hydrofluoroolefin (HFO), hydrofluorocarbon (HFC), hydrochlorofluoroolefin (HCFO), or a hydrocarbon. The blowing agent is effective as a blowing agent in the manufacture of thermosetting foams.

7 Claims, No Drawings

TETRAFLUOROBUTENE BLOWING AGENT COMPOSITIONS FOR POLYURETHANE FOAMS

FIELD OF THE INVENTION

The present invention relates to blowing agents for thermosetting foams. More particularly, the present invention relates to the use of 2,4,4,4-tetrafluorobutene-1 alone or in a combination as a blowing agent in the manufacture of thermosetting foams and thermosetting foams made with such blowing agents.

BACKGROUND OF THE INVENTION

The Montreal Protocol for the protection of the ozone layer mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change. The emerging replacement materials, hydrofluoropropenes, were shown to be environmentally acceptable i.e. has zero ozone depletion potential (ODP) and acceptable low global warming potential (GWP).

Currently, blowing agents for thermoset foams include HFC-134a, HFC-245fa, HFC-365mfc that have relatively high global warming potential, and hydrocarbons such as pentane isomers which are flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides the low global warming potential and zero or near zero ozone depletion properties desired.

The object of the present invention is to provide novel compositions that can serve as blowing agents for thermosetting foams and thermosetting foams made therefrom that provide unique characteristics to meet the demands of low or zero ozone depletion potential, lower global warming potential and exhibit low toxicity.

DETAILED DESCRIPTION OF THE INVENTION

The present invention relates to the use of blowing agents based upon unsaturated halogenated hydroolefins with negligible (low or zero) ozone-depletion and low GWP. The blowing agents comprise the hydrofluoroolefin (HFO), 2,4,4,4-tetrafluorobutene-1 alone or in a combination including an additional hydrofluoroolefin (HFO), a hydrochlorofluoroolefin (HCFO), a hydrofluorocarbon (HFC), a hydrofluoroether (HFE), a hydrocarbon, an alcohol, an aldehyde, a ketone, an ether/diether or carbon dioxide. The present inventors found that 2,4,4,4-tetrafluorobutene-1 shows unexpectedly better performance when forming polyurethane foam than other isomers of HFO-1354.

The isomers of HFO 1354 are, E/Z—CF$_3$CH=CF—CH$_3$, E/Z—CF$_3$CF=CHCH$_3$, E/Z—CF$_3$CH=CHCH$_2$F, E/Z—CHF$_2$CF=CF—CH$_3$, E/Z—CHF$_2$CF=CHCH$_2$F, E/Z—CHF$_2$CH=CFCH$_2$F, E/Z—CHF$_2$CH=CHCHF$_2$, E/Z—CH$_2$FCF=CFCH$_2$F, E/Z—CH$_2$FCH=CHCF$_3$, E/Z—CH$_2$FCF=CHCHF$_2$, CF$_3$CH$_2$CF=CH$_2$, CF$_3$CFHCH=CH$_2$, E/Z—CF$_3$CH$_2$CH=CHF, CHF$_2$CF$_2$CH=CH$_2$, CHF$_2$CHFCF=CH$_2$, E/Z—CHF$_2$CHFCH=CHF, CH$_2$FCF$_2$CF=CH$_2$, E/Z—CH$_2$FCF$_2$CH=CHF, E/Z—CH$_2$FCHFCF=CFH, CH$_2$FCHFCH=CF$_2$, CH$_2$FCH$_2$CF=CF$_2$, E/Z—CH$_3$CF$_2$CF=CFH, CH$_3$CF$_2$CH=CF$_2$, Hydrofluoroolefin (HFO) HFO-1354 has been proposed as blowing agents that exhibit a low global warming potential and zero ozone depletion value. The low global warming potential is a result of the atmospheric degradation of the hydrohaloolefins.

The HFO 2,4,4,4-tetrafluorobutene-1, alone or in a combination with additional HFOs can be used as a foaming agent for thermosetting foams by being mixed in a polyols mixture. The resulting products show superior qualities including decreased density and improved k-factor. The 2,4,4,4-tetrafluorobutene-1 foaming agent readily dissolves in thermosetting polymers, and provides a degree of plasticization sufficient to produce acceptable foams. 2,4,4,4-tetrafluorobutene-1 is a liquid at ambient temperature, which allows for ease of handling as is desired by various industries particularly for polyurethane foams. The preferred additional HFO component typically contains 3, 4, or 5 carbons, and including but not limited to pentafluoropropanes, such as 1,2,3,3,3-pentafluoropropene (HFO 1225ye); tetrafluoropropenes, such as 1,3,3,3-tetrafluoropropene (HFO 1234ze), 2,3,3,3-tetrafluoropropene (HFO 1234yf), 1,2,3,3-tetrafluoropropene (HFO1234ye); trifluoropropenes, such as 3,3,3-trifluoropropene (1243zf) and mixtures thereof. Preferred embodiments of the invention are blowing agent compositions of unsaturated halogenated hydroolefins with normal boiling points less than about 60° C.

The preferred blowing agent composition of the present invention, 2,4,4,4-tetrafluorobutene-1, alone or in a combination, exhibits good solubility in polyol mixtures used in producing polyurethane and polyisocyanurate foams. When a blowing agent combination is used, a major portion of the blowing agent composition of the present invention is 2,4,4,4-tetrafluorobutene-1. The preferred blowing agent combination produces foam having desirable levels of insulating value.

The 2,4,4,4-tetrafluorobutene-blowing agent of the present invention may be used in combination with other blowing agents including but not limited to: (a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluopropane (HFC245fa); 1,1,1,3,3-pentafluobutane (HFC365mfc) and 1,1,1,2,2,3,4,5,5,5-decafluoropentane (HFC4310mee), (b) additional hydrofluoroolefins including but not limited to tetrafluoropropenes (HFO1234), trifluoropropenes (HFO1243), pentafluorobutenes (HFO1345), tetrafluorobutenes (HFO1354) other than 2,4,4,4-tetrafluorobutene-1, hexafluorobutenes (HFO1336), heptafluorobutenes (HFO1327), heptafluoropentenes (HFO1447), octafluoropentenes (HFO1438), nonafluoropentenes (HFO1429), (c) hydrocarbons including but not limited to, pentane isomers, butane isomers, (d) hydrofluoroether (HFE) such as, C$_4$F$_9$OCH$_3$ (HFE-7100), C$_4$F$_9$OC$_2$H$_5$ (HFE-7200), CF$_3$CF$_2$OCH$_3$ (HFE-245cb2), CF$_3$CH$_2$CHF$_2$ (HFE-245fa), CF$_3$CH$_2$OCF$_3$ (HFE-236fa), C$_3$F$_7$OCH$_3$ (HFE-7000), 2-trifluoromethyl-3-ethoxydodecofluorohexane (HFE 7500), 1,1,1,2,3-hexafluoro-4-(1,1,2,3,3,3-hexafluoropropoxy)-pentane (HFE-7600), 1,1,1,2,2,3,5,5,5-decafluoro-3-methoxy-4-(trifluoromethyl)pentane (HFE-7300), ethyl nonafluoroisobutyl ether/ethyl nonafluorobutyl ether (HFE 8200), CHF$_2$OCHF$_2$, CHF$_2$—OCH$_2$F, CH$_2$F—

$OCH_2F$, $CH_2F$—O—$CH_3$, cyclo-$CF_2CH_2CF_2$—O, cyclo-$CF_2CF_2CH_2$—O, $CHF_2$—$CF_2CHF2$, $CF_3CF_2$—$OCH_2F$, $CHF_2$—O—$CHFCF_3$, $CHF_2$—$OCF_2CHF_2$, $CH_2F$—O—$CF_2CHF_2$, $CF_3$—O—$CF_2CH_3$, $CHF_2CHF$—O—$CHF_2$, $CF_3$—O—$CHFCH_2F$, $CF_3CHF$—O—$CH_2F$, $CF_3$—O—$CH_2CHF_2$, $CHF_2$—O—$CH_2CF_3$, $CH_2FCF_2$—O—$CH_2F$, $CHF2$-O—$CF_2CH_3$, $CHF_2CF_2$—O—$CH_3$ (HFE254pc), $CH_2F$—O—$CHFCH_2F$, $CHF_2$—CHF—O—$CH_2F$, $CF_3$—O—$CHFCH_3$, $CF_3CHF$—O—$CH_3$, $CHF_2$—O—$CH_2CHF_2$, $CF_3$—O—$CH_2CH_2F$, $CF_3CH_2$—O—$CH_2F$, $CF_2HCF_2CF_2$—O—$CH_3$, $CF_3CHFCF_2$—O—$CH_3$, $CHF_2CF_2CF_2$—O—$CH_3$, $CHF_2CF2CH_2$—$OCHF_2$, $CF_3CF_2CH_2$—O—$CH_3$, $CHF_2CF_2$—O—$CH_2CH_3$, $(CF_3)_2CF$—O—$CH_3$, $(CF_3)_2CH$—O—$CHF_2$, $(CF_3)_2CH$—O—$CH_3$, and mixture thereof; (e) C1 to C5 alcohols, C1 to C5 esters, C1 to C4 aldehydes, C1 to C4 ketones, C1 to C4 ethers and diethers and carbon dioxide, (f) HCFOs such as, 1-chloro-3,3,3-trifluropropene (HCFO-1233zd), 2-chloro-3,3,3-trifluoropropene (HCFO-1233xf) and HCF01223 and mixtures thereof.

The foamable compositions of the present invention generally include one or more components capable of forming foam having a generally cellular structure and a blowing agent, typically in a combination, in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam compositions, a blowing agent in accordance with the present invention can be included in the foamable composition, or as a part of a two or more part foamable composition, which preferably includes one or more of the components capable of reacting and/or foaming under the proper conditions to form a foam or cellular structure.

The invention also relates to foam, and preferably closed cell foam, prepared from a polymer foam formulation containing a blowing agent composition in accordance with the present invention. In yet other embodiments, the invention provides foamable compositions comprising thermosetting foams, such as polyurethane and polyisocyanurate foams, preferably low-density foams, flexible or rigid foams with a blowing agent composition of the present invention.

It will be appreciated by those skilled in the art that the order and manner in which the blowing agent combination of the present invention is formed and/or added to the foamable composition does not generally affect the operability of the present invention. For example, in the case of polyurethane foams, it is possible that the various components of the blowing agent combination, and even the components of the present composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner. Nevertheless, in certain embodiments, two or more components of the blowing agent combination are combined in advance and introduced together into the foamable composition, either directly or as part of premix that is then further added to other parts of the foamable composition.

In certain embodiments, a b-side, polyol premix can include polyols, silicon or non-silicon based surfactants, amine or non-amine based catalysts, flame retardants/suppressors, acid scavengers, radical scavengers, fillers, and other necessary stabilizers/inhibitors and mixtures thereof. Exemplary polyols include glycerin based polyether polyols such as CARPOL® GP-700, GP-725, GP-4000, GP-4520; amine based polyether polyols such as CARPOL®TEAP-265 and EDAP-770, JEFFOL® AD-310; sucrose based polyether polyol, such as JEFFOL® SD-360, SG-361, and SD-522, VORANOL® 490, CARPOL®SPA-357; mannich based polyether polyol such as JEFFOL® R-425X and R-470X; sorbitol based polyether polyol such as JEFFOL S-490; aromatic polyester polyols such as TERATE® 2541 and 3510, STEPANPOL® PS-2352, TEROL® TR-925.

Exemplary catalysts include N,N-dimethylethanolamine (DMEA), N,N-dimethylcyclohexylamine (DMCHA), Bis (N,N-dimethylaminoethyl)ether (BDMAFE), N,N,N',N',N"-pentamethyldiethylenetriamine (PDMAFE), 1,4-diazadicyclo[2,2,2]octane (DABCO), 2-(2-dimethylaminoethoxy)-ethanol (DMAFE), 2-((2-dimethylaminoethoxy)-ethyl methyl-amino)ethanol, 1-(bis(3-dimethylamino)-propyl) amino-2-propanol, N,N',N"-tris(3-dimethylamino-propyl) hexahydrotriazine, dimorpholinodiethylether (DMDEE), N.N-dimethylbenzylamine, N,N,N',N",N"-pentaamethyl-dipropylenetriamine, N,N'-diethylpiperazine, and etc. In particular, sterically hindered primary, secondary or tertiary amines are useful, for example, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-(α-phenyethyl) amine, tri-n-propylamine, dicyclohexylamine, t-butylisopropylamine, di-t-butylamine, cyclohexyl-t-butylamine, de-sec-butylamine, dicyclopentylamine, di-(α-trifluoromethylethyl) amine, di-(α-phenylethyl)amine, triphenylmethylamine, and 1,1,-diethyl-n-propylamine. Other sterically hindered amines are morpholines, imidazoles, ether containing compounds such as dimorpholinodiethylether, N-ethylmorpholine, N-methylmorpholine, bis(dimethylaminoethyl)ether, imidizole, n-methylimidazole, 1,2-dimethylimidazole, dimorpholinodimethylether, N,N,N',N',N",N"-pentamethyldiethylenetriamine, N,N,N',N',N",N"-pentaethyldiethylenetriamine, N,N,N',N',N",N"-pentamethyldipropylenetriamine, bis(diethylaminoethyl) ether, bis(dimethylaminopropyl)ether, or combinations thereof.

Non-amine catalysts include stannous octoate, dibutyltin dilaurate, dibutyltin mercaptide, phenylmercuric propionate, lead octoate, potassium acetate/octoate, quaternary ammonium formates, ferric acetylacetonate and mixtures thereof.

The use level of the catalysts typically range in an amount of 0.05 to 4.00 wt % of polyol premix, preferably from 0.15 to 3.60 wt %, and more preferably from 0.40 to 2.60 wt %.

Exemplary surfactants include polysiloxane polyoxyalkylene block co-polymer such as B8404, B8407, 138409, and B8462 of Goldschmidt, DC-193, DC-197, DC-5582, and DC-5598 of Air Products, L-5130, L5180, L-5340, L-5440, L-6100, L-6900, L-6980, and L-6988 of Momentive. Exemplary non-silicone surfactants are salts of sulfonic acid, alkali metal salts of fatty acid, ammonium salts of fatty acid, oleic acid, stearic acid, dodecylbenzenedidulfonic acid, dinaphthylmetanedissulfonic acid, ricinoleic acid, an oxyethylated alkylphenol, an oxyethylated fatty alcohol, a paraffin oil, a caster oil ester, a ricinoleic acid ester, Turkey red oil, groundnut oil, a paraffin fatty alcohol, and combinations thereof. The typically use levels are 0.4 to 6 wt % of polyol premix, preferably 0.8 to 4.5 wt %, and more preferably 1 to 3 wt %.

Exemplary flame retardants include trichloropropyl phosphate (TCPP), triethyl phosphate (TEP), diethyl ethyl phosphate (DEEP), diethyl bis (2-hydroxyethyl) amino methyl phosphonate, brominated anhydride based ester, dibromoneopentyl glycol, brominated polyether polyol, melamine, ammonium polyphosphate, aluminium trihydrate (ATH), tris(1,3-dichloroisopropyl) phosphate, tri)2-chlororthyl) phosphate, tri(2-chloroisopropyl) phosphate, chloroalkyl phosphate/oligomeric phosphonate, oligomeric chloroalkyl phosphate, brominated flame retardant based on pentabromo diphenyl ether, dimethyl methyl phosphonate, diethyl N,N bis(2-hydroxyethyl) amino methyl phosphonate, oligomeric phosphonate, and derivatives and combinations thereof.

In certain embodiments, acid scavengers, radical scavengers, and other stabilizers/inhibitors are desired. Exemplary stabilizer/inhibitors include 1,2-epoxy butane, glycidyl methyl ether, cyclic-terpenes such as dl-limonene, 1-limonene, d-limonene, and etc, 1,2-epoxy-2,2-methylpropane, nitromethane, diethylhydroxyl amine, alpha methylstyrene, isoprene, p-methoxyphenol, m-methoxyphenol, dl-limonene oxide, hydrazines, 2,6-di-t-butyl phenol, hydroquinone, organic acids such as carboxylic acid, dicarboxylic acid, phosphonic acid, sulfonic acid, sulfamic acid, hydroxamic acid, formic acid, acetic acid, propionic acid, butyric acid, caproic acid, isocaprotic acid, 2-ethylhexanoic acid, caprylic acid, cyanoacetic acid, pyruvic acid, benzoic acid, oxalic acid, malonic acid, succinic acid, adipic acid, azelaic acid, trifluoroacetic acid, methanesulfonic acid, benzenesulfonic acid, and combination thereof. Other additives such as adhesion promoters, anti-static, antioxidant, filler, hydrolysis, lubricants, anti-microbial, pigment, viscosity modifier, UV resistance, may be used as needed. Examples of these additives include but not limited to, sterically hindered phenols, diphenylamines, benzofuranone derivatives, butylated hydroxytoluene (BHT), calcium carbonate, barium sulphate, glass fibers, carbon fibers, micro-spheres, silicas, melamine, carbon black, forms of waxes and soaps, organometallic derivatives of antimony, copper, and arsenic, titanium dioxide, chromium oxide, iron oxide, glycol ethers, dimethyl AGS esters, propylene carbonate, benzophenone and benzotriazole compounds derivatives and mixtures thereof.

EXAMPLES

Example 1

The formulations tested (all had an Iso Index of 115) each contained RUBINATE® M, a polymeric methylene diphenyl diisocyanate (MDI) available from Huntsman; Jeffol R-425-X, a polyol from Huntsman; VORANOL® 490, a polyol from Dow Chemical, Stepenpol PS 2352, a polyol from Stepan. ANTIBLAZE® 80 is a flame retardant from Rhodia; B 8465 is a surfactant from Goldschmidt Chemical Corporation. POLYCAT® 8 and 5 (pentamethyldiethylenetriamine, PMDETA) are available from Air Products. Three isomers of HFO 1354 were tested: (A) 2,4,4,4-tetrafluorobutene-1, (B) Z-1,1,1,3,-tetrafluorobutene-2 and (C) E-1,1,1,3,-tetrafluorobutene-2. Since they are isomers, they have same molecule weight of 128 g/mol. Table 1 summarizes the formula used. Total blowing level was 20.0 mls/g.

TABLE 1

| Formulation | (weight %) |
|---|---|
| JEFFOL® R-425-X | 10.88 |
| VORANOL® 490 | 18.13 |
| STEPENPOL® PS 2352 | 7.25 |

TABLE 1-continued

| Formulation | (weight %) |
|---|---|
| ANTIBLAZE® 80 | 2.36 |
| Water | 0.64 |
| B 8465 | 0.71 |
| POLYCAT® 8 | 0.36 |
| PMDETA | 0.07 |
| HFO 1354 | 6.85 |
| RUBINATE® M | 52.72 |
| Total | 100.00 |

Example 2

The solubility of a blowing agent in a polyol blends determines blowing efficiency, foam quality that has a direct impact on insulation properties. Using the formula as in Table 1, solubility was evaluated by its appearance when blended in the polyols. The results are summarized in Table 2,

TABLE 2

| HFO 1354 solubility in polyol blends | | | |
|---|---|---|---|
| HFO 1354 isomer | A | B | C |
| Polyol blends appearance | Clear | Clear | Opaque* |

*Opaque: emulsion-like, and difficult to add into polyol blends
A: 2,4,4,4-tetrafluorobutene-1
B: Z-1,1,1,3,-tetrafluorobutene-2
C: E-1,1,1,3,-tetrafluorobutene-2

The data shows that the solubility of C, E-1,1,1,3-tetrafluorobutene-2 in polyol blends is poor as compared to two other isomers, thus it can not be an effective blowing agent.

Example 3

The A-side (MDI) and B-side (mixture of the polyol, surfactant, catalysts, blowing agent, and additives) were mixed with a hand mixer and dispensed into a container to form a free rise foam. When making a free rise foam, the dispensed material was allowed to expand in an open container. The resulting foam had a 53-second gel time, and 90-second tack free time, a free rise density is summarized in Table 3

TABLE 3

| Free Rise Density | | | |
|---|---|---|---|
| HFO 1354 isomer | A | B | C |
| Density, pcf | 2.05 ± 0.01 | 2.08 ± 0.01 | 2.24 ± 0.02 |

The data in Table 3 shows that C, E-1,1,1,3-tetrafluorobutene-2 is not as efficient as the other two since the free rise density of the resulted foam is much higher.

Example 4

Dimensional stability of foams was studied using 5"×5"×1" sample of foam and measuring the change in dimensions of the foam aged under ambient conditions, the results are summarized as in Table 4,

TABLE 4

| | Dimensional stability | | |
|---|---|---|---|
| HFO 1354 isomer | A | B | C |
| Dimensional change | None | Shrunk | None |

The data in Table 4 shows that the foam made by B, Z-1,1,1,3-tetrafluorobutene-2 is not dimensionally stable even after 14 days, suggesting it is not an effective blowing agent.

Example 5

K-factor measurements (ASTM C518) on the foams were conducted between 10 and 130° F. Initial k-factors are taken within 24 hours after removing foam skin with a band saw. Lower k-factors indicate better insulation values. The results are summarized in Table 5.

TABLE 5

| | k-factor | | |
|---|---|---|---|
| | $k$ (Btu·in./ft$^2$·h·° F.) of HFO 1354 | | |
| Temperature (° F.) | A | B | C |
| 17.6 | 0.1297 | 0.1371 | 0.1315 |
| 32.0 | 0.1303 | 0.1368 | 0.1355 |
| 50.0 | 0.1347 | 0.1361 | 0.1434 |
| 75.2 | 0.1452 | 0.1395 | 0.1554 |
| 104.0 | 0.1587 | 0.1508 | 0.1702 |

The data in Table 5 shows that that over the 17.6 to 104.0° F. temperature range, A, 2,4,4,4-tetrafluorobutene-1 in the best blowing agent for initial k-factor in that it rendered the best thermal insulation for low and high temperature insulations.

Example 6

The k-factor of the foams at 50° F. was measured as a function of time to study k-factor aging, ASTM C518 was followed as in Example 5. The data is summarized in Table 6.

TABLE 6

| | Aged k-Factor | | |
|---|---|---|---|
| Time | $k$ (Btu·in./ft$^2$·h·° F.) of HFO 1354 | | |
| (Days) | A | B | C |
| 30 | 0.1383 | 0.1601 | 0.1557 |
| 60 | 0.1444 | 0.1744 | 0.1586 |
| 90 | 0.1501 | 0.1791 | 0.1601 |
| 120 | 0.1526 | 0.1811 | 0.1632 |

Table 6 shows that even though B, Z-1,1,1,3-tetrafluorobutene-2 had low k-factor as compared to C, E-1,1,1,3-tetrofluorobutene-2 (Table 5), its k-factor decayed quickly, this is probably due to shrinkage of the foam. C, E-1,1,1,3-tetrafluorobutene-2 foam did not shrink and its k-factor went up much faster than A. This is most likely due to foam quality of C being lower that A, 2,4,4,4-tetrafluorobutene-1 because of poor solubility in polyol blends. Thus the foam made by A, 2,4,4,4-tetrafluorobutene-1 has the significantly slowest aging rate.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A process of foaming a polyurethane foam comprising mixing polyurethane foam forming components comprising one or more polyols, one or more surfactants, one or more catalysts and one or more flame retardants with a foam blowing agent comprising 2,4,4,4-tetrafluorobutene-1 wherein said polyurethane foam exhibits a k-factor at 50° F. when tested in accordance with ASTM C518 ranging from an initial, k-factor of 0.1347 Btu·in./ft$^2$·h·° F. to a k-factor of 0.1526 Btu·in./ft$^2$·h·° F. upon aging said foam for 120 days.

2. The process of claim 1, wherein said foam blowing agent further comprising a hydrofluorocarbon.

3. The process of claim 2 wherein said hydrofluorocarbon is sleeted from the group consisting of difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluopropane (HFC245fa); 1,1,1,3,3-pentaflubutane (HFC365mfc) 1,1,1,2,2,3,4,5,5,5-decafluoropentane (HFC4310mee) and mixtures thereof.

4. The process of claim 1, wherein said foam blowing agent further comprising a hydrofluoroolefin.

5. The process of claim 4 wherein said hydrofluoroolefin is selected from the group consisting of tetrafluoropropenes (HFO1234); trifluoropropenes (HFO1243); tetrafluorobutene (HFO 1354 other than 2,4,4,4-tetrafluorobutene-1); pentafluorobutenes (HFO1345); heptafluorobutenes (HFO1327); heptafluoropentenes (HFO1447); octafluoropentenes (HFO1438); nonafluoropentenes (HFO1429) and mixtures thereof.

6. The process of claim 1, wherein said foam blowing agent further comprises an additive selected from the group consisting of hydrocarbons, pentanes, butanes, C1 to C5 alcohols, C1 to C5 esters, C1 to C4 aldehydes, C1 to C4 ketones, C1 to C4 ethers, carbon dioxide, C1 to C4 diethers and mixtures thereof.

7. The process of claim 1, wherein said foam blowing agent further comprising a hydrochlorofluoroolefin selected from the gropupd consisting of 1233zd (1-chloro-3,3,3-trifluoropropene) and 1233xf (2-3,3,3-trifluoropropene.

* * * * *